No. 672,971. Patented Apr. 30, 1901.
G. WESTINGHOUSE.
ROTARY PUMP.
(Application filed Apr. 9, 1898. Renewed Feb. 18, 1901.)
(No Model.) 6 Sheets—Sheet 1.

WITNESSES:
Ethan D. Dodds
Hubert C. Tener

INVENTOR
George Westinghouse
BY
Harley E. Carr
ATTORNEY.

THE NORRIS PETERS CO., PHOTO-LITHO., WASHINGTON, D. C.

No. 672,971. Patented Apr. 30, 1901.
G. WESTINGHOUSE.
ROTARY PUMP.
(Application filed Apr. 9, 1898. Renewed Feb. 18, 1901.)

(No Model.) 6 Sheets—Sheet 6.

WITNESSES:
Ethan D. Dodds
Herbert C. Tener.

INVENTOR
George Westinghouse
BY
Wiley E. Carr
ATTORNEY.

THE NORRIS PETERS CO., PHOTO-LITHO., WASHINGTON, D. C.

UNITED STATES PATENT OFFICE.

GEORGE WESTINGHOUSE, OF PITTSBURG, PENNSYLVANIA.

ROTARY PUMP.

SPECIFICATION forming part of Letters Patent No. 672,971, dated April 30, 1901.

Application filed April 9, 1898. Renewed February 18, 1901. Serial No. 47,855. (No model.)

*To all whom it may concern:*

Be it known that I, GEORGE WESTINGHOUSE, a citizen of the United States, residing in Pittsburg, in the county of Allegheny and State of Pennsylvania, have invented a new and useful Improvement in Rotary Pumps, of which the following is a specification.

My invention relates to rotary pumps, and more particularly to devices of this character which are employed for pumping and compressing air, although not necessarily limited in all respects to this specific use.

The object of my invention is to provide a pump which will be simple and compact in construction and effective in operation and which is automatically self-adjusting, so that it may be rotated in either direction without changing the external connections to always force the fluid in the same direction.

Figure 1:
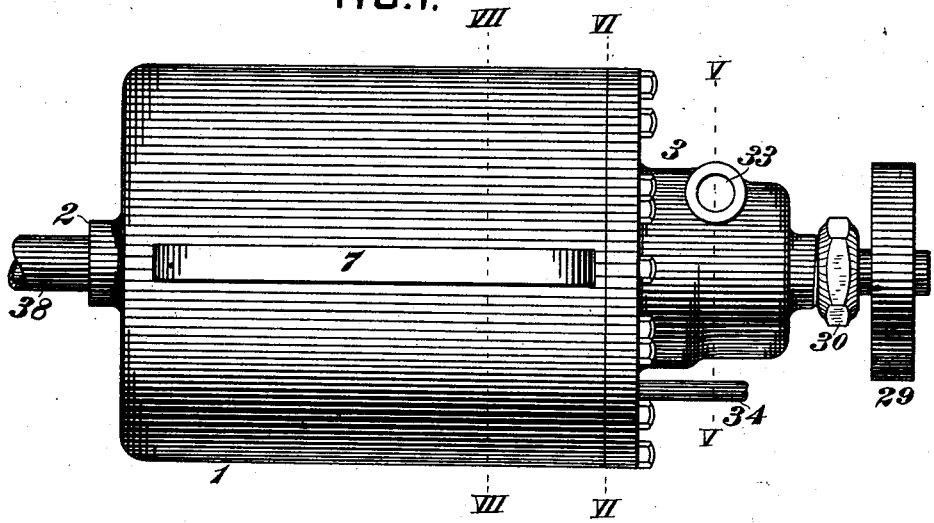
Figure 2:
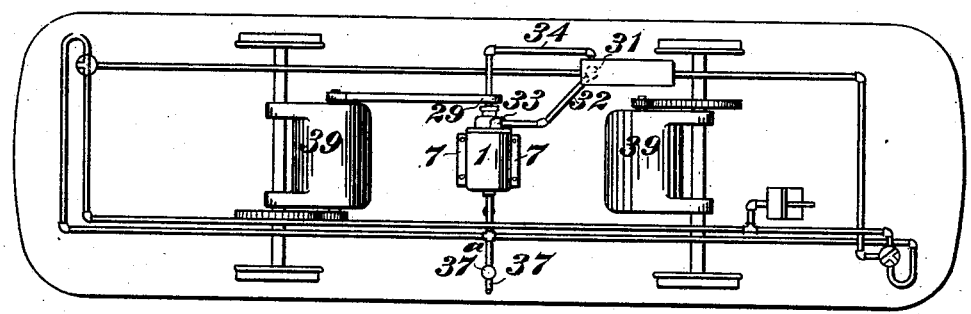
Figure 3:
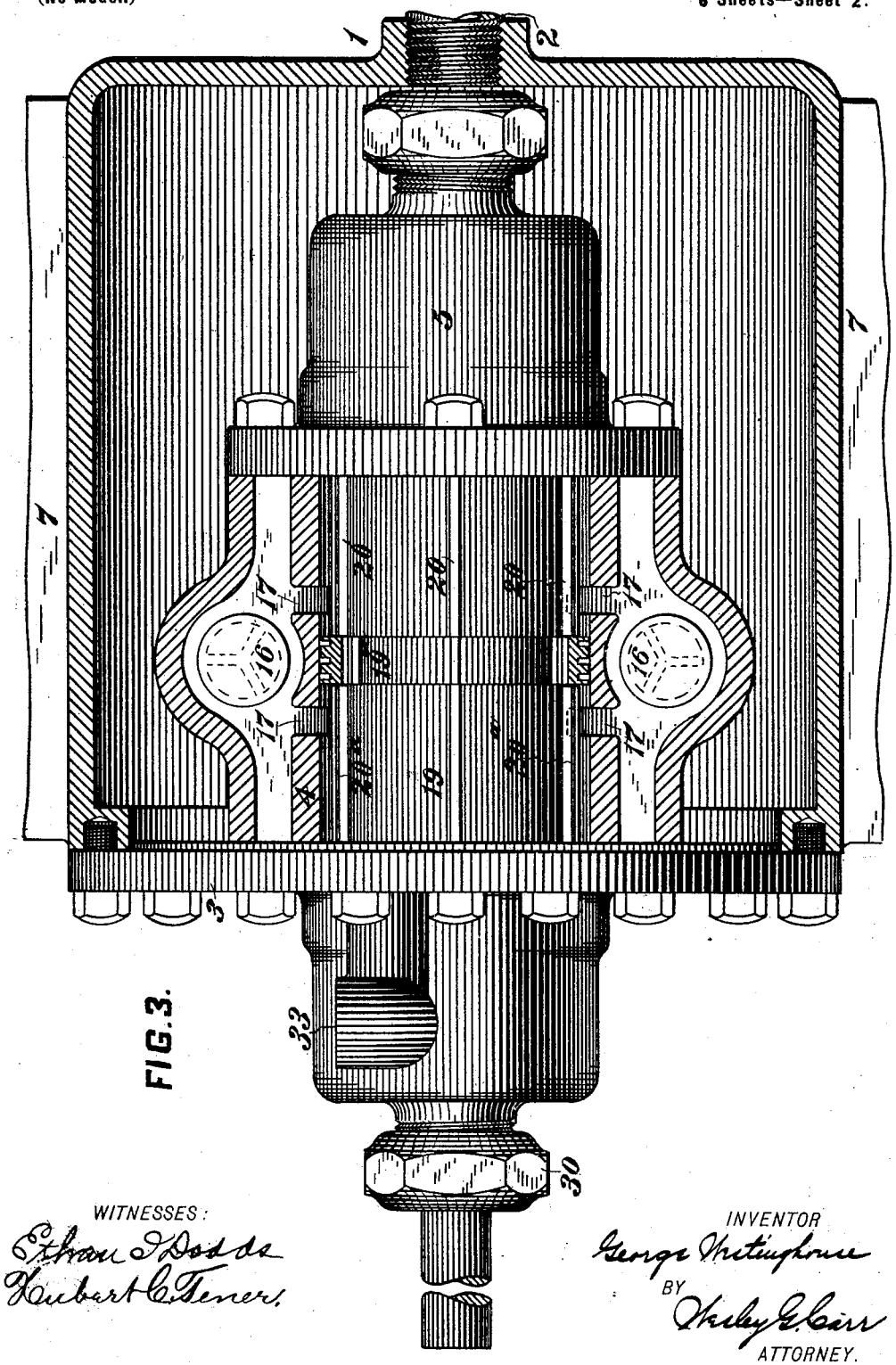
Figure 4:
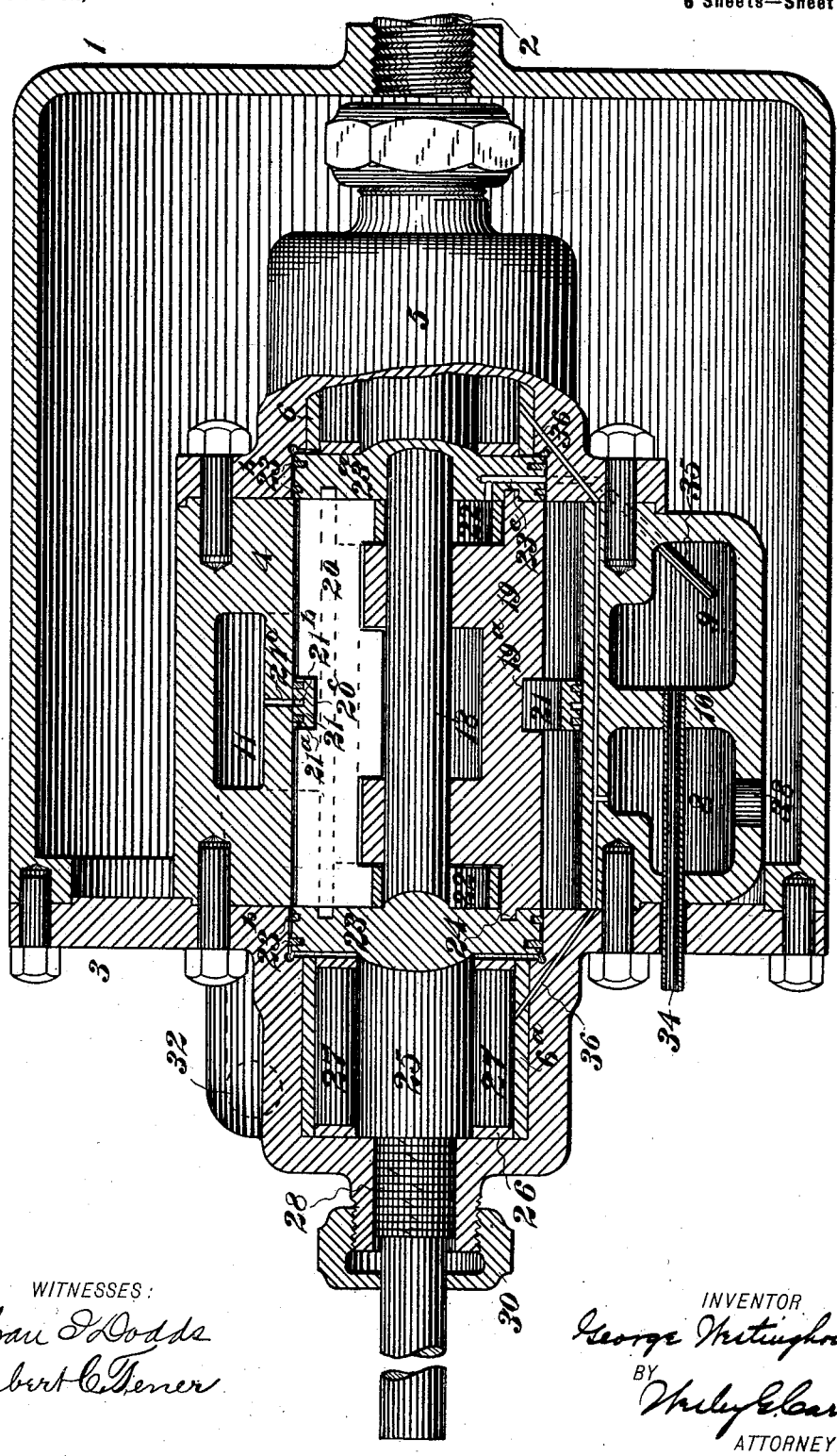
Figure 5:
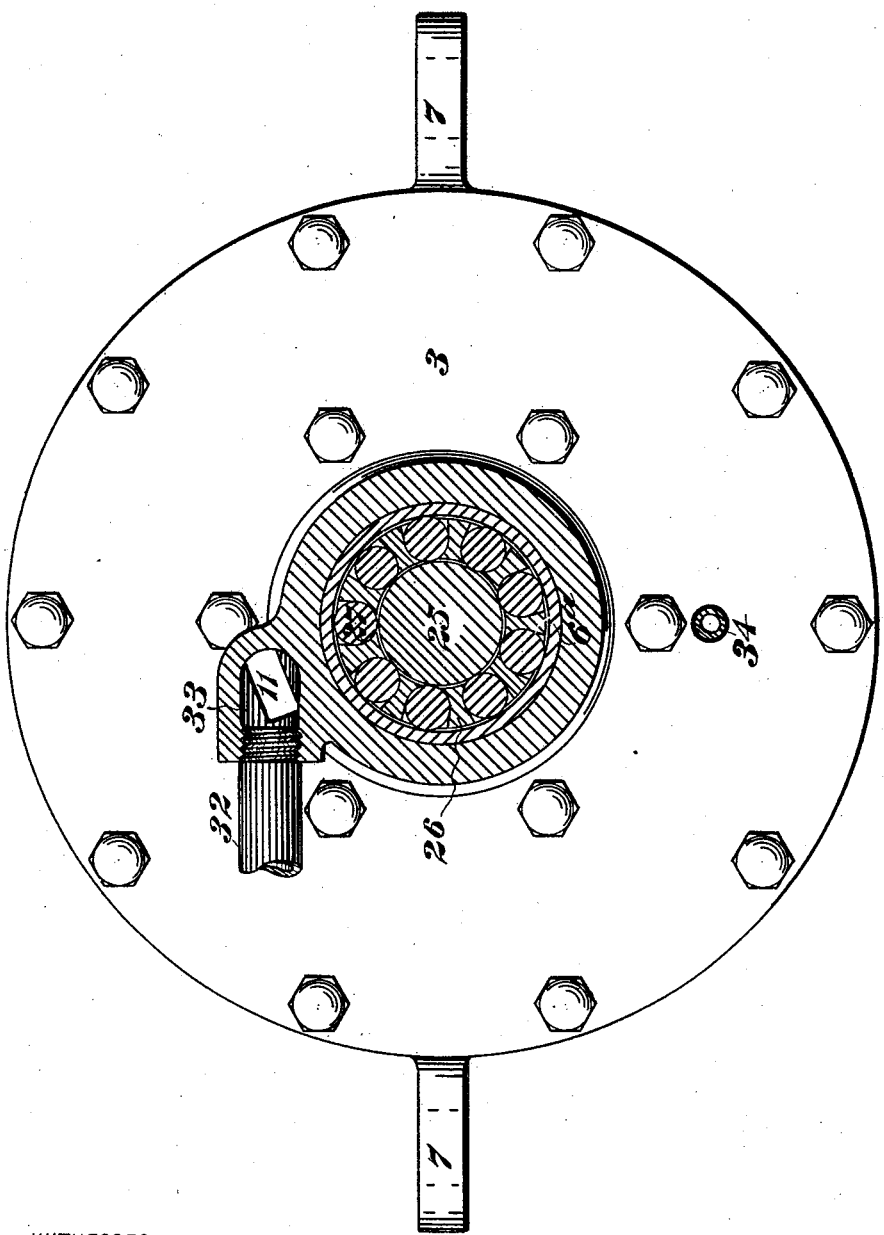
Figure 6:
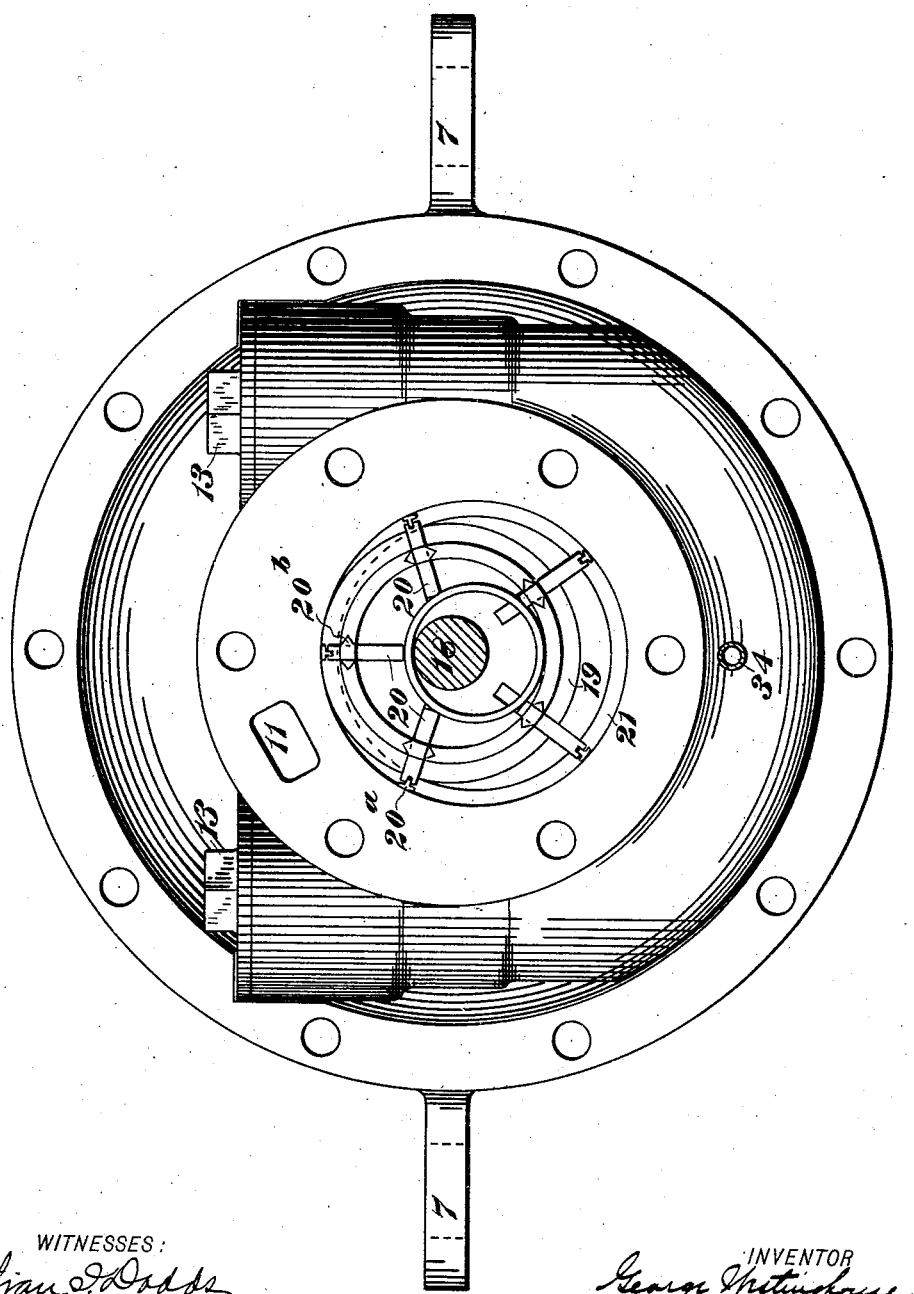
Figure 7:
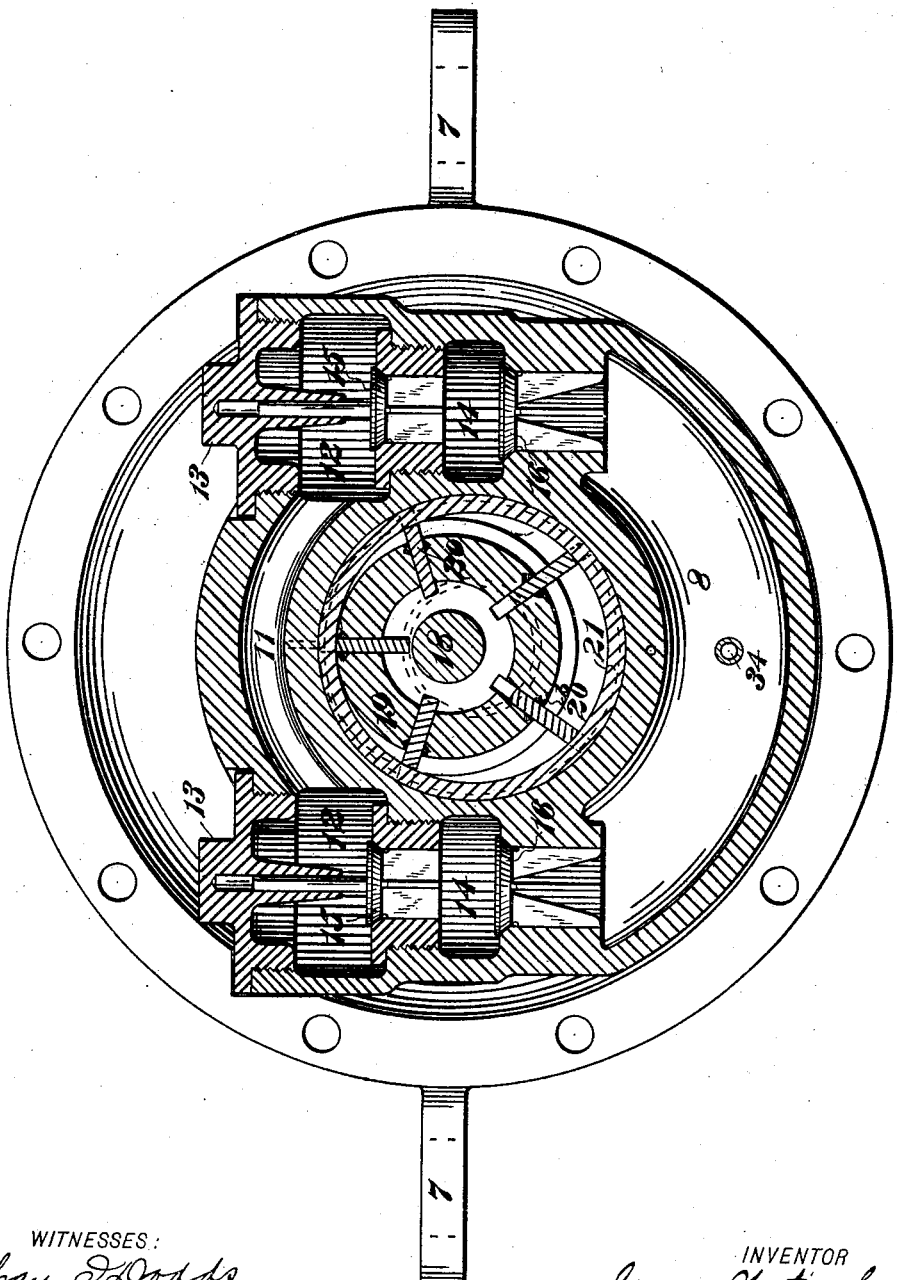

In the accompanying drawings, Figure 1 is a side elevation of a pump constructed in accordance with my invention. Fig. 2 is a diagrammatic plan view of the wheels, axles, and motors of a railway-vehicle and an air-pump, storage-cylinder, valves, pipes, and brake-cylinder forming parts of an air-brake equipment. Fig. 3 is a view, partially in plan and partially in longitudinal section, of the pump shown in Fig. 1. Fig. 4 is a vertical longitudinal section of the pump shown in Figs. 1, 2, and 3; and Figs. 5, 6, and 7 are transverse sectional views taken, respectively, on lines V, VI, and VII of Fig. 1.

Reference being now had to the details of construction as illustrated in the several figures, 1 is a cylindrical outer casing constituting a chamber permanently closed at one end except for an air-inlet 2 and closed at the other end by means of a head 3, bolted thereto, as shown. An inner casing 4, having a cylindrical bore, abuts at one end against the head 3 and is fastened thereto by means of bolts. The other end of the casing 4 has a head 5, which is fastened to the side walls by bolts and contains a steel bushing 6. The head 3, bolted to the end of the casing 1, also contains a steel bushing $6^a$ like that just described. The casing 1 is provided at each side with a long horizontally-projecting lug 7, these lugs being employed for supporting the apparatus upon the car-truck or wherever else it may be desired to use it. The side walls of the inner casing 4 are provided at the bottom with two chambers 8 and 9, separated by a partition 10, and at the top with a single chamber 11. The top chamber 11 is in open communication at its ends with valve-chambers 12 of like construction, the top of each valve-chamber 12 being closed by a cap 13. Each of these chambers 12 communicates with a similar chamber 14, located below it, the communicating passage between these chambers being normally closed by upwardly-opening valves 15, the stems of which are received and guided in sockets in the caps 13.

Each of the chambers 14 communicates with the large chamber 8 in the bottom of the casing-wall by means of an opening, which is normally closed by an upwardly-opening valve 16.

Each of the chambers 14 is in open communication with the internal cylinder of the casing 4 through ports 17. A shaft 18 extends longitudinally through the cylinder or casing 4 and is located eccentrically therein. Mounted upon the shaft 18 is a drum 19 of such diameter as to be approximately in contact with the inner top side of the cylinder. This drum is provided with a plurality of slots, five being shown in the present instance, in which are located piston-slides 20. The outer edges of these piston-slides may be provided with independently-movable packing-strips $20^a$, and packing-strips $20^b$, triangular in cross-section, may also be inserted in corresponding openings in the drum at the sides of the slides. (See Figs. 6 and 7.) Each piston-slide 20 is also provided approximately midway of its ends with a rectangular recess $20^c$, Fig. 4.

A balancing-ring 21, the external circumference of which is very nearly equal to the internal circumference of the cylinder, surrounds the drum and piston-slides and fits into the several recesses $20^c$ in the slides and into a corresponding annular recess $19^a$ in the drum as the latter is rotated.

It will be understood that a plurality of balancing-rings and corresponding recesses symmetrically located with reference to the ends of the drum may be employed, if desired.

The exterior periphery of the balancing-ring 21 may be provided with two packing-rings 21$^a$ and with an intermediate circumferential groove 21$^b$, which communicates with chamber 11 by a passage 21$^c$.

The drum 19 is recessed at its ends adjacent to the shaft for the reception of two rings 22, the inner sides of the recesses 20$^c$ in the slides 20 being held against the inner periphery of the balancing-ring 21 by means of these rings and by centrifugal force.

At one end of the cylinder the shaft 18 is provided with a head-plate 23 of approximately the same diameter as the drum. This head-plate may be formed integral with the shaft, if desired, and is provided with peripheral packing-rings 23$^b$. The end of the drum is provided with an annular centering-tongue 24, which fits into a corresponding groove in the head-plate 23. A cylindrical bearing portion 25, of somewhat larger diameter than the main portion of the shaft, extends beyond the head-plate 23 and fits in a cage 26 between bearing-rollers 27 contained therein. Beyond this bearing portion 25 the shaft is reduced to substantially the same size as that portion located inside the cylinder and is provided with a series of packing-rings 28, beyond which it projects the necessary distance to receive the pulley 29 or other power-transmitting device. The outer end of the head is fitted with a screw nut or cap 30, as shown. The shaft 18 is provided at the other end of the drum with a head-plate 23$^a$ similar to the head 23 before described, including the annular groove for the reception of a centering-tongue on the drum and the bearing portion extending beyond the plate and coöperating with bearing-rollers. This head-plate 23$^a$ and its bearing portion are movable on the shaft, however, a nut (not shown) being screwed upon the end of the shaft and pressing these heads and the drum firmly together. This head-plate is provided also with an annular groove between its packing-rings and with a passage 23$^c$, leading therefrom to the interior of the drum 19.

The shaft and its bearings, the drum and its slides, and the coöperating bearing-rings herein shown and described constitute a portion of the subject-matter of my application, Serial No. 677,078, of even date herewith, and no claim is herein made to these particular features.

Referring now more particularly to Fig. 2, in connection with the other figures of the drawings, 31 is an air-reservoir, from which extends a pipe 32, connecting to the outlet-opening 33 of the pump. This reservoir 31 preferably contains a small supply of oil, which as the air is pumped into the tank is forced out through the pipe 34 into the chamber 9 and thence passes through the pipe 35 and passage 23$^c$ into the interior of the drum 19, where it is forced by means of the centrifugal action and air-pressure between and around the slides and the other moving parts of the apparatus, and thus serves both as a lubricant and as a packing. Any oil which passes the packing-rings 23$^b$ in the head-plates 23 and 23$^a$ will flow back into the chamber 8 through the passages 36. (Indicated in Fig. 4.) The air-inlet pipe 37 may be provided with a check-valve 37$^a$, as is indicated in Fig. 2, and as the air is drawn through this valve and pipe into the casing 1 and through the opening 38 into the chamber 8 in the bottom of the cylinder-wall it will pass into the pump-cylinder in the one direction or the other, according to the direction of rotation of the drum and slides.

As shown in Fig. 2, the pump is driven by one of the car-motors 39 through a belt 40.

The air-pipes, valves, and brake-cylinders and pistons may be of usual construction and do not therefore require detailed description.

Referring to Fig. 7, if the drum be rotated from left to right a partial vacuum will be created in the right-hand chamber 14, by reason of which valve 15 will be held to its seat and valve 16 will be raised. Air will then be drawn through right-hand chamber 14 and forced into left-hand chamber 14. This air-pressure will hold the corresponding valve 16 to its seat and raise valve 15. The air thus pumped will pass through chambers 12 and 11 and pipe 32 to reservoir 31. If, on the other hand, the cylinder be rotated from right to left, the air will be drawn through left-hand chamber 14 and forced into and through right-hand chambers 14 and 12 and chamber 11 and pipe 32 to reservoir 31. It will thus be seen that the pump adjusts itself automatically, so as to force air always in the same direction throughout the outlet-opening 33 and its pipe 32, irrespective of the direction of rotation of the pump-cylinder and pistons.

While I have described specific details of construction, I desire to be understood that the invention is not limited to such details, it being possible to vary the same within considerable limits without departing from the spirit and scope of the invention.

I claim as my invention—

1. A pump comprising a cylinder, a rotatable drum mounted eccentrically in said cylinder and provided with piston-slides, a rotatable balancing-ring, a port at each side of the cylinder, an inlet-chamber communicating with both of said ports by valved openings and an outlet-chamber communicating with both of said ports by valved openings, whereby said pump may be operated in either direction.

2. In a pump, the combination with a rotatable drum provided with piston-slides, of a casing having a cylindrical bore in which said drum is eccentrically located and having an inlet-chamber below said bore, and an outlet-chamber above said bore, both of which communicate with a port at each side through valved openings.

3. The combination with a rotatable drum having piston-slides mounted therein, of a casing having a cylinder in which said drum is eccentrically located, an inlet-chamber below and an outlet-chamber above said cylinder, an upper chamber at each side in open communication with said outlet-chamber, a lower chamber at each side in open communication with said cylinder, an upwardly-opening valve normally closing the passage between each pair of side chambers and an upwardly-opening valve normally closing the passage between each lower side chamber and the inlet-chamber, and an outer casing inclosing and supporting said parts.

4. A rotary eccentric-piston pump having a port and two independently-acting automatic valves at each side.

5. A rotary, eccentric-piston pump having a port and two independently-acting valves at each side, the corresponding parts being alike in construction and arrangement.

6. A rotary eccentric-piston pump provided with an air-inlet chamber below and with an air-outlet chamber above and having a port and two independent upwardly-opening valves at each side whereby the direction of rotation of the pump may be reversed without reversing the current of air through the inlet and outlet pipes.

7. A rotary, eccentric-piston pump comprising an outer casing, an inner casing supported by one end of the outer casing, a rotatable drum having piston-slides and eccentrically located in said inner casing, a shaft on which said drum is mounted and roller-bearings for said shaft.

8. A rotary, eccentric-piston pump comprising an outer casing, an inner casing supported by one end of the outer casing, a rotatable drum having piston-slides and eccentrically located in said inner casing, a shaft on which said drum is mounted and roller-bearings for said shaft.

9. In a rotary, eccentric-piston pump, a cylinder provided with a port at each side and a drum provided with piston-slides and rotatable in either direction in said cylinder, in combination with inlet and outlet pipes and a plurality of independent, self-adjusting valves adjacent to each cylinder-port and operating to make the current of air in the inlet and outlet pipes unidirectional.

In testimony whereof I have hereunto subscribed my name this 29th day of March, 1898.

GEO. WESTINGHOUSE.

Witnesses:
WESLEY G. CARR,
H. C. TENER.